United States Patent Office 3,316,271
Patented Apr. 25, 1967

3,316,271
2 - METHYL - 7 - ALKOXY - 1,2,3,4 - TETRAHYDRO-5H-PYRID[4,3-b]INDOLES AND A METHOD FOR THEIR PREPARATION
Aaron Cohen and Christopher John Cattanach, Welwyn Garden City, England, assignors to Hoffman-La Roche Inc., Nutley, N.J., a corporation of New York
No Drawing. Filed Oct. 9, 1963, Ser. No. 314,868
Claims priority, application Great Britain, Oct. 16, 1962, 39,034/62
2 Claims. (Cl. 260—296)

This invention relates to indole derivatives and to processes for their preparation. More particularly, the present invention relates to indole derivatives of the formula

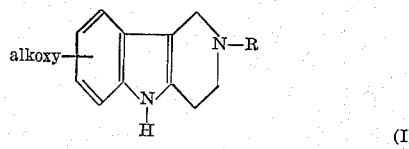

(I)

wherein R is an alkyl group, preferably a lower alkyl group, i.e. containing from one to seven carbon atoms which can be either straight or branched-chain, e.g., methyl, ethyl, propyl, isopropyl, butyl, hexyl, heptyl, etc., and "alkoxy" is preferably lower alkoxy (the lower alkyl portion thereof being defined as above for R), and acid addition salts thereof with pharmaceutically acceptable acids (e.g., mineral acids, such as hydrochloric acid, hydrobromic acid, hydroiodic acid, nitric acid, phosphoric acid, sulfuric acid, etc., and organic acids such as acetic acid, citric acid, tartaric acid, latic acid, benzenesulfonic acid, toluenesulfonic acid, etc.).

Preferred compounds are 2-methyl-7-propoxy-1,3,4,5-tetrahydropyrid[4,3-b]-indole and its hydrochloride addition salt.

The indole derivatives of Formula I are prepared by condensing an alkoxy-phenyl-hydrazine with a 1-alkyl-4-piperidone wherein the alkoxy group has the same meaning as given above for the compounds of Formula I and the 1-alkyl group in the 1-alkyl-4-piperidone has the same meaning as the R group in the compounds of Formula I, followed by cyclizing the resulting condensation product to form an acid addition salt of a compound of Formula I, and if desired, converting the resulting acid addition salt into a free base of Formula I or into another acid addition salt.

The condensation reaction is preferably carried out by heating the above starting materials in a solvent, e.g., a lower alkanol such as ethanol.

The cyclization step is preferably carried out by heating the solution of the above condensation product with dry hydrogen chloride whereupon the hydrochloride of a compound of Formula I is obtained. This hydrochloride can then be treated with a base, e.g., ammonium hydroxide, sodium hydroxide, etc. The free base can then, if desired, be converted into an acid addition salt by treatment with a corresponding acid.

The compounds of the invention are useful in the treatment and prevention of cardiovascular disorders involving intravascular clotting, e.g., coronary thrombosis. The instant compounds decrease blood platelet adhesiveness while not substantially affect either the clotting or coagulation times or the prothrombin or recalcification times.

The invention is illustrated by the following example which is given for illustration purposes only.

Example

A mixture of 10 g. (0.602 mol.) of m-propoxy-phenylhydrazine in 6.81 g. (0.0602 mol.) of 1-methyl-4-piperidone in 54 ml. of ethanol is heated under reflux. Thereafter, the mixture is treated with dry hydrogen chloride until saturated, while continuing to heat.

The mixture, containing suspended solid, is evaporated in vacuo and the solid residue dissolved in 200 ml. of warm water and filtered to give a clear solution. The clear solution is made alkaline with excess 2N sodium hydroxide solution. After a precipitate forms, the mixture is cooled to 0° C. and the solid collected, washed with water and dried in vacuo at 40° C., weight 11.8 g. Crystallization from ethanol yields pure 2-methyl-7-propoxy-1,3,4,5-tetrahydro-pyrid[4,3-b]-indole in the form of white needles of melting point 159°–160° C. The hydrochloride prepared therefrom crystallizes from 2 N aqueous hydrochloric acid in white needles of melting point 239–240° C.

We claim:

1. A compound selected from the group consisting of an indole derivative of the formula

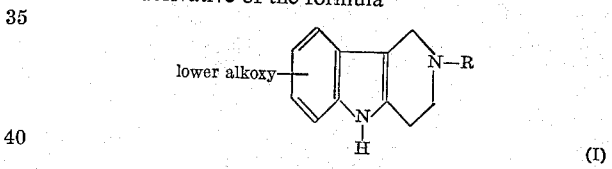

(I)

wherein R is lower alkyl and an acid addition salt thereof with a pharmaceutically acceptable acid.

2. A compound selected from the group consisting of 2 - methyl - 7 - propoxy - 1,3,4,5 - tetrahydro - pyrid [4,3-b]-indole and the hydrochloride addition salt thereof.

References Cited by the Examiner

Boekelheide et al.: J. Am. Chem. Soc., vol. 72, pp. 2132–4.

Rosnati et al.: Chem. Abstracts, vol. 49, par. 13, 907 (1950).

WALTER A. MODANCE, *Primary Examiner.*

A. ROTMAN, *Assistant Examiner.*